Feb. 17, 1970    R. W. ROBERTS ET AL    3,495,886
THRUST BEARING

Filed Feb. 29, 1968    2 Sheets-Sheet 1

Inventors:
Richard W. Roberts
and Robert L. Zieg
By: Robert L. Zieg Atty.

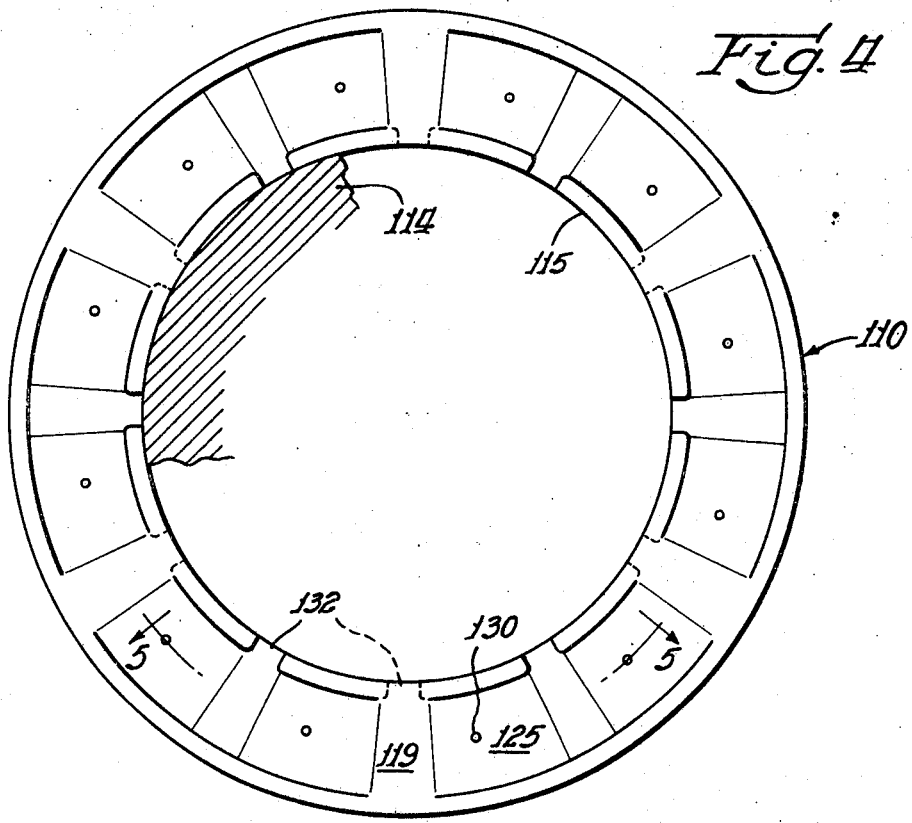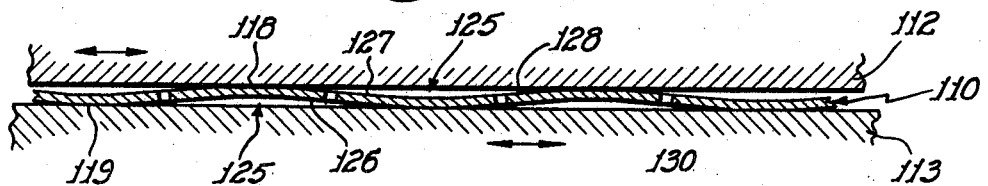

United States Patent Office 3,495,886
Patented Feb. 17, 1970

3,495,886
THRUST BEARING
Richard W. Roberts, Lombard, and Robert L. Zieg, Park Forest, Ill., assignors to Borg-Warner Corporation, Chicago, Ill., a corporation of Illinois
Filed Feb. 29, 1968, Ser. No. 709,437
Int. Cl. F16c 17/04, 17/06
U.S. Cl. 308—135
8 Claims

ABSTRACT OF THE DISCLOSURE

An improved washer type thrust bearing for use between relatively rotating surfaces in which a series of pressure pockets are provided on either side of the bearing, the pressure pockets being in communication with a supply of pressure fluid and the pressure pockets including inclined surfaces adapted to develop a fluid pressure wedge when relative rotation occurs between the two relatively rotating surfaces, and each of said pockets on one side of said bearing being in communication with a pocket on the other side so that the bearing supports the load by means of the fluid pressure wedges and with relative rotation on each side of the thrust washer.

SUMMARY OF THE INVENTION

A plain, flat thrust washer has very little load-carrying capacity since there is no inherent tendency to form a hydrodynamic wedge and generate the high fluid pressures necessary to support the load without metallic contact within the bearing. Various groove and pocket configurations have been developed to promote the formation of hydrodynamic wedges and thereby improve the performance of washer-type thrust bearings. Generally, however, all the relative motion occurs at one face of the thrust washer. It is the object of this invention to insure that both faces of the thrust washer are utilized, thereby reducing the relative velocities between the adjacent surfaces with a consequent reduction in the viscous drag of the bearing and the generation of heat in the fluid.

In solving this problem the present invention includes a series of pressure pockets provided on opposite sides of a thrust bearing, the pressure pockets having a surface inclined with respect to the surface of the thrust bearings whereby when relative rotation occurs between the two surfaces between which the thrust bearing is used, due to the shape of the pressure pockets, will form fluid wedges by shearing forces on the fluid which will support the load to be carried by the bearing. The improved thrust bearing thus develops its own pressure to support the load. By means of communicating the pressure and equalizing the pressure between the pockets on one side with the pressure pockets on the other side of the bearing a balanced condition is provided for the thrust bearing enabling it to center itself between the adjacent surfaces.

DESCRIPTION OF THE DRAWINGS

FIGURE 4 is a plan view of a modified form of the invention;
and
FIGURE 5 is a view taken along the line 5—5 of FIGURE 4.

Referring to FIGURE 1, there is shown an improved thrust bearing 10 which is adapted for use between a pair of relatively rotating elements 12 and 13. The elements 12 and 13 may be parts of a transmission or other machinery in which a thrust load is developed between the two parts and must be absorbed by a thrust bearing. For example, the element 13 could be a stationary part of a transmission case and the element 12 could be a rotating gear.

Figure 1:
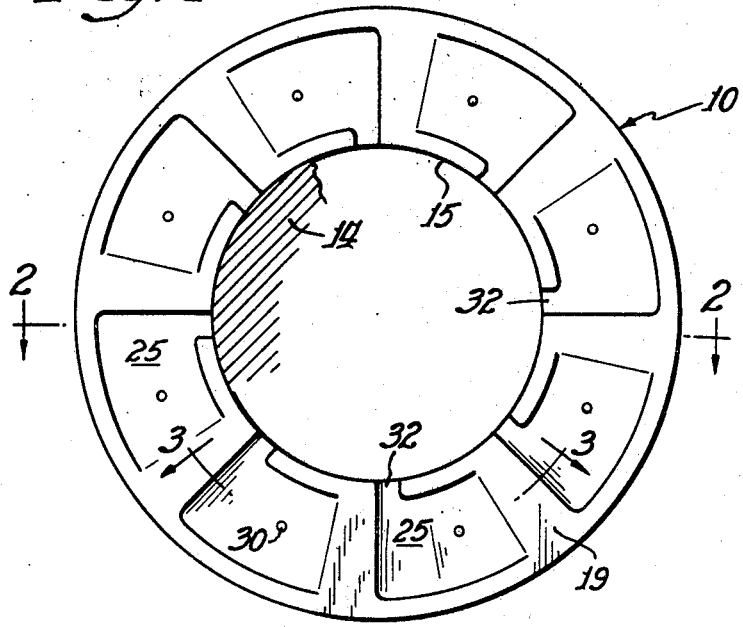
FIGURE 1 is a plan view of a thrust bearing embodying the principles of the present invention.

A support shaft 14 is illustrated which may be a shaft, for example, which extends through a central bore 15 provided in the thrust bearing 10. The thrust bearing has a bearing surface 18 on one side thereof and a bearing surface 19 on the other side thereof. Formed in the bearing surfaces is a series of pressure pockets 25. The pressure pockets 25 are equally disposed in an arcuate sense on each of the surfaces 18 and 19.

Figure 3:
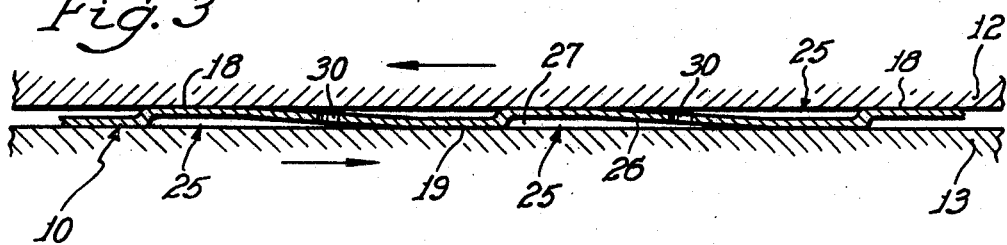
FIGURE 3 is a sectional view taken along line 3—3 of FIGURE 1.

Referring to FIGURE 3, pressure pockets 25 are of arcuate configuration and include a bottom surface 26 which is inclined with respect to the bearing surfaces 18 and 19. In cross-section as shown in FIGURE 3, the pressure pockets have a deep portion as indicated at 27 and the bottom surface 26 gradually extends at an angle and intersects the bearing surface 18.

The pressure pockets 26, as illustrated in the drawing, are greatly exaggerated for purposes of illustration. The pockets would be formed in the bearing by means of coining or a sheet metal stamping operation so that the depth would be approximately .005 to .010 inch.

As viewed in FIGURE 3, two-thirds of the arcuate length of the pressure pockets as measured from the edge of the pocket on the deepest portion at 27 there is provided a fluid passage 30 which interconnects each of the pressure pockets 25 on one side of the bearing with a matching pressure pocket on the opposite side of the bearing. The inclined surfaces 26 of the pressure pockets on one side are parallel to those on the opposite side of the thrust bearing and the location of the pressure pockets on either side of the bearing is such that the fluid passages 30 are located approximately two-thirds of the arcuate length of the pocket from the deepest end toward the point at which the pocket joins the bearing surfaces 18 and 19 with regard to each of the pressure pockets that the fluid passage connects.

Due to the pressure pockets on each side of the bearing having the bottom surface 26 thereof parallel and of opposite hand as compared to the pressure pocket on the other side, when relative rotation of the elements 12 and 13 occur as, for example, from the direction of the arrows, a wedge of fluid under pressure (or a hydrodynamic wedge) is formed due to the shearing forces on the fluid of the relatively rotating elements, in the shallowest part of the pressure pockets. If one of the elements is stationary, as for example 13, and element 12 is rotating in the direction of the arrow, the bearing 10 will assume an equilibrium speed of one-half the difference in rotational speeds between elements 12 and 13. As the relative rotation occurs and the fluid pressure wedges are built up on the side of the bearing toward element 12 and element 12 is rotating in the direction of the arrow, pressure will be communicated through the fluid passage 30 so that a fluid wedge will also be formed in the pressure pockets 25 on either side of the bearing. Thus the bearing will be balanced and pressure pockets will be developed directly opposite one another to provide the support for the load against the bearing.

Referring to FIGURE 1, the pressure pockets have a radial inward extending passage 32 which intersects the bore 15 in the bearing 10. Thus with fluid supplied by means of holes or passages (not illustrated) provided in support 14 the fluid will be communicated through the radial passages 32 to the pressure pockets 25. The radial passages 32 are of the same depth as the deepest portion of the pressure pockets.

As is apparent from the showing in FIGURE 3, the bearing there illustrated is operative only with relative rotation occurring as demonstrated by the arrows in the drawing. Since the fluid pressure wedges are formed by the relative rotation in a direction to urge the fluid up the inclined surfaces 26, the pockets are aligned for only one direction of relative rotation. However, when the thrust bearing 10 is to be used in configurations where relative relation may occur in either direction, the thrust bearing 10 may be conveniently used by using two of the thrust bearings with one inverted with respect to the other with a solid plate between the two thrust bearings. Thus with either direction of relative rotation occurring one of the thrust bearings will be operative to form the fluid wedges and provide means to bear the load.

It will be apparent from the above description that the present invention provides an economical type of hydrodynamic thrust bearing in that the thrust bearing may be formed from a simple stamping or coining operation. Further, with this type of thrust bearing, a source of relatively high fluid pressure is not required since the thrust bearing is operative if fluid is supplied into the pressure pockets, the pressure being developed by the relative rotation between the parts themselves.

Referring to FIGURE 4, a modified form of the invention is illustrated comprising a thrust bearing adaptable for use in environments where relative rotation between two members may occur in either direction of rotation. Similar parts of the thrust bearing 110 of FIGURE 4 are numbered like those of the thrust bearing of FIGURES 1–3 with the exception that the numbers for thrust bearing 110 are in the "100" series.

Thrust bearing 110 of FIGURE 4 has pressure pockets 125 therein which include a bottom surface 126 which has an inclined angle sections 127 and 128 at either end thereof so that the sections 127 and 128 intersect the surfaces 118 or 119 of the thrust bearing at both ends of the pressure pockets. The arcuate location of the pressure pockets 125 on one side of the thrust bearing is staggered with respect to the pockets on the other side. A hole 130 is provided in each of the sections 127 and 128 of surface 126, the holes being located two-thirds of the distance between the center of the pressure pocket and at the points at which sections 127 and 128 intersect the surfaces of the thrust bearing. Since the pressure pockets 125 are staggered each of the holes 130 has a similar location with respect to the center of a pressure pocket on each side of the thrust bearing. Each of the surface sections 127 or 128 is parallel to the corresponding surface section on the opposite side of said bearing with which it is in communication by means of holes 130.

It will be apparent that with either direction of rotation of the thrust bearing 110 a pressure wedge will be formed by shear forces tending to pressurize the fluid in the area of one of the sections 127 or 128 of the pockets 125. Similar to the embodiment of FIGURES 1–3 this pressure wedge is communicated through the holes 130 to an identical area on the opposite side of the trust bearing.

Conveniently, only one radially extending inlet passage 132 is necessary to conduct oil or lubricating fluid from the center of the bearing into the pressure pocket 125. This passage 132 for each of the pressure pockets will serve to conduct fluid into the pockets so that the fluid will be supplied for either direction of relative rotation. The passages 132 are equally radially displaced on each side of thrust bearing 110 so that alternate ones of the passages 132 appear in hidden lines in FIGURE 4.

Figure 2:
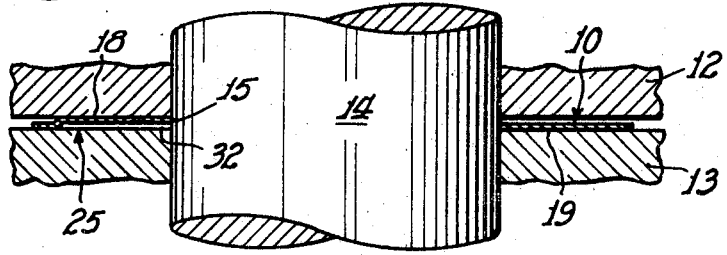
FIGURE 2 is a sectional view showing the thrust bearing assembled between two relatively rotating structures.

As was the case with the embodiment of FIGURES 1–3 the depth of the pockets 125 is greatly exaggerated as illustrated in FIGURES 4 and 5 for the purpose of clarity. Similar to the embodiment of FIGURES 1–3 the thrust bearing 110 of FIGURES 4 and 5 may be manufactured by a coining or stamping process so as to simplify manufacture and reduce the cost of providing a thrust bearing of this nature.

As will be apparent from the above description, the embodiment of FIGURES 4 and 5 conveniently provides a single thrust bearing 110 which will operate to develop fluid wedges on the surface thereof to support the bearing load when relative rotation occurs between the parts 112 and 113 in either sense of relative rotation of the parts 112 and 113. Further, similar to the embodiment of FIGURE 1, the thrust bearing 110 will be perfectly balanced since pressure wedges identical to one another are developed on each side of the bearing and maintained through the medium of the holes 130 extending between similar areas of pressure pockets on either side of the thrust bearing 110. It should be noted however, that for the same size bearings, the unidirectional embodiment as shown in FIGURE 1 will have approximately twice the load carrying capacity as the bidirectional embodiment is shown in FIGURES 4 and 5.

Further, by means of the present invention including the fluid passages interconnecting pressure pockets on either side of the thrust bearing is inherently in balance in that the pressure wedges are formed in direct relation to one another on opposite sides of the bearing for supporting the load.

We claim:
1. A thrust bearing for use between two relatively rotating sufaces, said bearing including a surface on opposite sides thereof, a series of pressure pockets disposed radially on each of said surfaces, each of said pockets including an inclined surface, first passage means adapted to communicate pressure fluid to said pockets, second passage means for each of said pockets extending through said bearing and placing in fluid communication each of said pressure pockets on one surface of said bearing with a pressure pocket on the opposite side of said bearing whereby upon relative rotation of said relatively rotating surfaces said inclined surfaces will develop fluid wedges in each of said pockets on each side of said bearing, said fluid wedges providing a load-bearing means equally disposed about said bearing on either side thereof.

2. A thrust bearing as claimed in claim 1 wherein said first passage means comprises a radially inwardly extending passage for each of said pressure pockets formed in said bearing surfaces.

3. A bearing as claimed in claim 1 wherein the inclined surfaces on one side of said bearing are oppositely inclined with respect to the relatively rotating surfaces as compared to the inclined surfaces on the other side of said bearing.

4. A bearing as claimed in claim 1 wherein said inclined surfaces on one side of said bearing are parallel to the inclined surfaces on the other side of said bearing.

5. A bearing as claimed in claim 2 including a central bore therethrough adapted to receive a support for said bearing each of said first passage means extending between said pressure pockets and said bore to supply fluid to said pockets.

6. A thrust bearing for use between two relatively rotating surfaces, said bearing including a bearing surface on opposite sides thereof, a series of pressure pockets disposed in each of said surfaces, said pressure pockets including an inclined surface section at either end thereof, the inclined surface sections for each of the pressure pockets intersecting the bearing surface on one side of the thrust bearing whereby in either direction of relative rotation of the relatively rotating surfaces a fluid pressure wedge will be developed by said inclined surface sections on one end of each pressure pocket and further including passage means extending through said bearing and placing in fluid communication the area of each pressure pocket in which the fluid pressure wedge is developed with a similar area of a pressure pocket on the opposite side of said thrust bearing.

7. A thrust bearing as claimed in claim 6 wherein each of the inclined surfaces of a pressure pocket are parallel to the inclined surface on the opposite side of the thrust bearing with which the inclined surface is in communication through said passage means.

8. A thrust bearing as claimed in claim 6 wherein said thrust bearing has a central bore adapted to receive a support for the bearing, a radially extending fluid passage for each of said pressure pockets extending radially inwardly to said bore to supply fluid to said pressure pockets.

References Cited

UNITED STATES PATENTS

| | | |
|---|---|---|
| 2,289,053 | 7/1942 | Watres. |
| 2,653,062 | 9/1953 | Sperisen. |
| 2,615,766 | 10/1952 | Wallace _____ 308—240 |

MARTIN P. SCHWADRON, Primary Examiner

F. SUSKO, Assistant Examiner

U.S. Cl. X.R.

308—160, 163